3,270,547
THERMOCOUPLE CALIBRATION SYSTEM
Arthur L. MacRitchie, Morristown, and George E. Conklin, North Plainfield, N.J., assignors to Esso Research and Engineering Company, a corporation of Delaware
Filed Aug. 12, 1963, Ser. No. 301,403
2 Claims. (Cl. 73—1)

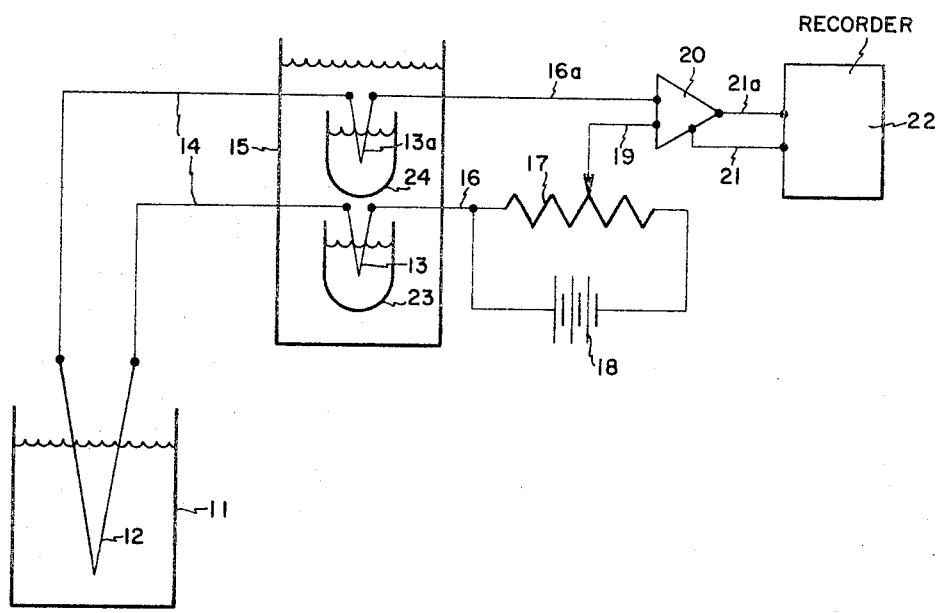

This invention relates to a method of thermocouple calibration; more specifically, it relates to a method of thermocouple calibration which is accurate, rapid and yet does not require a highly trained operator.

A thermocouple consists of two wires made of dissimilar metals which have been joined at one end, usually by welding. If the temperature of the joined end, known as the hot junction, is changed while the free ends, or cold junction, are maintained at a known temperature, an electric potential is developed within the system. This potential may be measured by using a potentiometer joined to the free ends.

The development of the electric potential is based upon several physical phenomena. One such phenomenon is based on the Thomson E.M.F., which is that part of the total potential due to the temperature gradient along each of the homogeneous wires. Additionally, there is that part of the total potential arising from the junction of wires of dissimilar metals known as the Peltier E.M.F. Other effects may also play a part in the development of the over-all potential but are not as yet well understood.

Over the years, combinations of metals have been established which give reasonably predictable current or voltage vs. temperature relationships. These relationships have been tabulated in the Standard Temperature-E.M.F. tables established by the National Bureau of Standards. These tables, however, are based on special standardized couples and the actual working couples will differ from the tables within certain limits. In many industries, particularly that of petroleum refining, greater accuracy than this is required. Thus, in order to measure temperatures closer than these limits, usual ±¾% of reading, it is necessary to measure the exact temperature—E.M.F. curve for each couple. Many conventional calibration techniques have been devised; typical of them is U.S. Patent 2,162,614. Here a temperature calibrating device was calibrated by inserting it, along with a standardized thermometer, in a heated metal block. The two were then compared and the error in the non-standardized thermometer was determined.

This method and those methods analogous to it are time consuming and also require highly skilled operators. The measuring procedure is boring and tedious since it requires a great amount of manipulation on the part of the operator; this increases the probability of error and tends to make this type of system highly inaccurate.

It is therefore an object of this invention to provide a means for the calibration of thermocouples which will be highly accurate.

It is a further object of this invention to provide means for the calibration of thermocouples which may be easily operated.

It is a still further object of this invention to provide means for the calibration of thermocouples which will be almost completely automatic after the initial installation.

According to this invention, elements are combined in a unique fashion to produce an original means of thermocouple calibration which satisfies these desired objects. The hot junction and the two ends of an uncalibrated thermocouple are immersed respectively in hot and cold baths maintained at accurately known temperatures. The standard voltage produced by thermocouples of the type being tested, for the temperature differential employed, may be obtained from the National Bureau of Standards. A potentiometer, adjusted to internally develop this standard voltage, is connected to the thermocouple. Accordingly, the potentiometer serves to oppose the voltage produced by the thermocouple being tested at the established temperature differential with the potential developed by the presetting of the potentiometer. Since the ordinary commercial thermocouple will not be equivalent to the standard thermocouple of the same type, the potentials in the system will not be in balance. The resulting differential potential is then amplified and the signal recorded on a recorder which has been preadjusted for a midscale reading. Any deflection from midscale represents the quantity of the test thermocouple's error. Additionally, the direction of the deflection is correlated with the additive or subtractive nature of the error found.

This error may be determined at many different temperatures by merely changing the hot standard. Freezing points of many pure materials such as metals, e.g. tin, lead, zinc, copper, aluminum, etc., are well known. In this manner, thermocouples may be calibrated at temperatures ranging from —300 to +2000° F.

The drawing represents an over-all schematic view of a preferred embodiment of this invention.

Turning now to the drawing, the reference numeral 11 refers to a secondary temperature standard. In one embodiment this standard is a freezing point furnace such as provided by H. S. Martin Co. Cat. #M9361 but of course any other suitable standard will suffice. Numeral 14 refers to the thermocouple which is to be calibrated. It has junctions 12, 13 and 13a, being the hot junction and the two cold junctions, respectively. Junction 12 is located within the freezing point furnace previously noted. Numerals 13 and 13a are junctions of each side of the thermocouple ends. Each cold junction is located in separate mercury wells 23 and 24, within the cold reference bath 15, e.g. an ice water bath at equilibrium. Numerals 16 and 16a refer to electrical conductors, e.g. copper leads which connect the thermocouple junction 13 with potential source, e.g. mercury cell 18 and potentiometer 17. Conductor 19 connects the potentiometer to amplifier 20. Amplifier 20 is connected to junction 13a by means of conductor 16a to complete the subcircuit. Conductors 21 and 21a lead from the amplifier 20 to a recorder 22.

In practice the hot junction 12 of an uncalibrated thermocouple 14, such as Chromel-Alumel; Copper-Constantan; Iron-Constantan; Platinum-Platinum, 10% Rhodium; or other thermocouples known to the art, is placed in a heat source of accurately known temperature, i.e. standard 11. The ends of thermocouple 14 form junctions 13 and 13a with copper leads 16 and 16a in reference cold source 15. The difference in temperature between the hot junction and the cold junction causes the thermocouple 14 to develop a potential which is transmitted along leads 16 and 16a. This generated potential has a standard value as established by the National Bureau of Standards for each thermocouple under a given temperature differential. A voltage equal to this standard value is established on potentiometer 17 connected across mercury cell 18, this voltage having a polarity opposite to that generated by the thermocouple. This standard voltage will then be balanced against the voltage generated by the thermocouple. The voltage transmitted by conductor 19 from potentiometer 17 thus represents the difference between the voltage transmitted by thermocouple 14 and the voltage which would be transmitted by an accurate (i.e. zero error) thermocouple comprised of the same two metals. This difference or error is then transmitted along conductor 19 to "floating" or ungrounded D.C. differential amplifier 20 where it is amplified. This amplified voltage is then transmitted to recorder 22 which has been preset for a midscale reading. Any deviation from midscale represents the error in this particular thermocouple. This error is recorded and may be allowed for in future uses of the particular thermocouple tested.

If a grounded input amplifier is used for ungrounded D.C. differential amplifier 20, the thermocouple and potentiometer both must be clear of ground. However, it was discovered that when thermocouples are tested in freezing point calibrators at temperatures above 600° F., a potential develops on the inside wall of the thermowell 11 which partially grounds the thermocouple or impresses an E.M.F. on it causing a large unbalance in the circuit.

The use of an ungrounded input amplifier permits the thermocouple to be grounded so the potential on the thermowell can be shorted out. In fact it has been found that more reliable readings are obtained if the thermocouples are grounded out at all test temperatures.

In a specific example of this invention, an apparatus such as is illustrated in the drawing was utilized. An Iron-Constantan thermocouple was tested. The thermocouple hot junction 12 was placed in a hot standard 11 as previously described, which standard contained pure tin at its freezing point, e.g., 449.4° F. on the International Temperature Scale. The ends of thermocouple 14 formed junctions 13 and 13a with copper leads 16 and 16a in mercury wells 23 and 24 placed in an ice and water reference bath 15 maintained at 32° F. At this temperature, Iron-Constantan wire produces an E.M.F. of 12.55 millivolts at junctions 13 and 13a as determined by the National Bureau of Standards. Accordingly, the potentiometer 17 across the mercury cell 18 was adjusted to provide 12.55 mv. as measured by a Leeds & Northrup Co. K₃ potentiometer. The battery and potentiometer combination was then connected to conductors 16 and 19 which in this case were copper wires. The polarity of the cold reference junction voltage led through conductor 16a is opposite to that produced through conductor 16.

The amplifier 20 in this embodiment was a Kin Tel model 114C and its gain was adusted so that an input of 0.03 mv. would cause recorder 22 to deflect one major division across a 10 division chart. Recorder 22 was of the Varian 0–10 mv. type and was so adusted that with a zero volt input to amplifier 20, the recorder pen would be positioned at midscale.

The secondary standard 11 was heated until the tin melted. At this time, heating was discontinued and the recording procedure commenced. As the metal cooled, the pen on recorder 22 traced a steady downward curve until the metal began to freeze. The slope of the curve then proceeded to level off until all the metal had solidified, at which time the recorder 22 began once again to record a downward trend. The part of the curve which was level corresponded to the freezing point of the tin, e.g., 449.4° F. If the thermocouple being tested was equivalent to the standard thermocouple as established by the National Bureau of Standards, then the level portion of the curve would lie exactly on the midscale line. However, since there is some difference in the thermocouples, the level portion of the curve was found to be off the midscale line. This procedure was run repeatedly and the deviation was found to be within ½ division from the center line for the particular Iron-Constantan thermocouple used. This was equivalent to thermocouple error of ½° F. which value corresponded favorably with results obtained by slower and more tedious calibration procedures.

The calibration procedure can be repeated using other materials in hot secondary standard 11. For example, the following metals are desirable standards, their freezing points having been accurately determined by the National Bureau of Standards:

| | Degrees Fahrenheit |
|---|---|
| Lead | 621.1 |
| Zinc | 787.1 |
| Aluminum | 1220.2 |
| Copper | 1981.4 |

Known millivoltages for various thermocouples at fixed temperature points are given in Table I. These values are used in the calibration technique described above.

TABLE I

| Reference Temperature | Thermocouple | Millivolts |
|---|---|---|
| Tin (449.4° F.) | Pt., 10%—Pt | 1.710 |
| | Chromel-Alumel | 9.42 |
| | Copper-Constantan | 11.012 |
| | Iron-Constantan | 12.55 |
| Lead (621.1° F.) | Pt., 10%—Pt | 2.566 |
| | Chromel-Alumel | 13.34 |
| | Copper-Constantan | 16.465 |
| | Iron-Constantan | 17.83 |
| Zinc (787.1° F.) | Pt. 10%—Pt | 3.438 |
| | Chromel-Alumel | 17.22 |
| | Iron-Constantan | 22.92 |
| Aluminum (1,220.2° F.) | Pt., 10%—Pt | 5.843 |
| | Chromel-Alumel | 27.46 |
| | Iron-Constantan | 36.70 |
| Copper (1,981.4° F.) | Pt., 10%—Pt | 10.540 |
| | Chromel-Alumel | 44.52 |

This invention is intended to be limited only by the appended claims.

What is claimed is:

1. A method for calibrating thermocouples which comprises immersing the hot junction of a thermocouple to be tested in an accurately known temperature standard, immersing the cold junction in a second, accurately known temperature standard, thereby generating an electric potential signal corresponding to the differential temperature of the said standards; passing the said generated electrical potential signal through a potentiometric meter; introducing a reference electrical potential signal in said potentiometric meter, said reference electrical potential signal having a value corresponding to that produced under the same temperature differential by a standard thermocouple of the same type as the said thermocouple being tested; taking the electrical difference between said generated electrical potential signal and said reference electrical potential signal; amplifying the resulting electrical potential difference signal and then recording the said electrical potential difference signal.

2. A method for calibrating thermocouples which comprises immersing the hot junction of a thermocouple to be tested in an accurately known temperature standard, immersing the cold junction in a second, accurately known temperature standard, thereby generating an electric potential signal corresponding to the differential temperature of the said standards; passing the said generated electrical potential signal through a potentiometric meter; introducing a reference electrical potential signal in said potentiometric meter, said reference electrical potential signal having a value corresponding to that produced under the same temperature differential by a standard thermocouple of the same type as the said thermocouple being tested; taking the electrical difference between said generated electrical potential signal and said reference electrical potential signal; and recording the said electrical potential difference signal.

References Cited by the Examiner

UNITED STATES PATENTS 1,791,563  2/1931  Horn _____ 73—360

OTHER REFERENCES

Quigley: Resume of Thermocouple Checking Procedure I.S.A. Precedings, vol. 6, 1951, pages 64–70. Pages 64, 67 and 68 relied upon.

Process Control Calibration System, a publication of Technique Associates, 1413 N. Cornell Ave., Indianapolis, Indiana, received May 29, 1959, page 14 relied upon.

LOUIS R. PRINCE, *Primary Examiner.*

S. C. SWISHER, *Assistant Examiner.*